UNITED STATES PATENT OFFICE.

JAMES CUDDY, OF PITTSBURG, PENNSYLVANIA, ASSIGNOR TO HIMSELF, EDWARD A. KITZMILLER, AND JOHN J. McDERMOTT.

IMPROVEMENT IN PROCESSES OF TREATING AND DRYING CIGARS AND TOBACCO.

Specification forming part of Letters Patent No. 136,490, dated March 4, 1873; reissue No. 6,127, dated November 10, 1874; application filed October 24, 1874.

*To all whom it may concern:*

Be it known that I, JAMES CUDDY, of Pittsburg, in the county of Allegheny and State of Pennsylvania, have invented a certain new and useful Improvement in the Manufacture of Cigars and other articles of Tobacco; and I do hereby declare that the following is a full, clear, and exact description thereof.

In the manufacture of cigars it is necessary to moisten the tobacco-leaf with water, after which the leaf is stripped from its stems, and wrappers of suitable patterns cut out of the sound leaf, the unsound portion being used as "fillers," forming the core of the cigar, the stock used in the construction of the cigar being necessarily damp for the purpose of enabling the cigar-maker to manipulate the wrapper and filling with facility.

The processes or means heretofore used for rapidly removing the moisture from the formed cigar result in imparting to the wrapper brittleness, which causes the wrapper to break and peel or scale off, thereby destroying the smoking qualities of the cigar by the admission of air into and among the filling, so that the draft upon the cigar is not brought to bear on the lighted end. If the cigar is laid away to dry by the slow process usually employed, the aroma of the tobacco escapes, and often a musty and disagreeable flavor is imparted to the cigar.

The object of my invention is to overcome the difficulties set forth in the foregoing, by allowing the leaf-tobacco to be suitably moistened with water and manipulated in the usual manner, but so dried that the wrapper will retain its desired flexibility and its cohesive properties, that the cigar may be handled and packed without injury to it, and also retain the natural aroma of the tobacco. This I accomplish by placing the formed cigar upon suitable racks arranged in a close box, room, or other compartment, placing above or below the racks a layer of quicklime, chloride of calcium, chloride of magnesia, or their chemical equivalents, and then closing said box, room, or other compartment, so as to prevent the free access of air. The undue moisture of the cigars will be absorbed with rapidity by the layer of quicklime, chloride of calcium, chloride of magnesia, in such way and manner as not to injure their wrapper, or cause them to shrink in the process of drying.

By the use of hereinbefore-described process, cigars and other articles of tobacco can be manufactured and be in a merchantable condition in a much shorter period of time than by any of the processes heretofore adopted for that purpose, enabling the manufacturer to conduct his business with less capital, and with great saving of time.

Persons skilled in the manufacture of the several branches connected with the various articles of tobacco, made, prepared, and sold as articles of merchandise, will readily understand the application and advantages of my improvement, I having given a single illustration of its use and advantages in the manufacture of a single article, viz., cigars.

Having thus described my improvement in the manufacture of cigars and other articles of tobacco, what I claim as of my invention is—

The process herein described for drying articles of tobacco, viz., abstracting the undue moisture from them by chloride of calcium, or its equivalent, placed in a closed chamber together with them.

JAMES CUDDY.

Witnesses:

ED. A. KITZMILLER,

JNO. J. McDERMOTT.